United States Patent
Driel et al.

(10) Patent No.: US 9,138,097 B2
(45) Date of Patent: Sep. 22, 2015

(54) DEVICE FOR HEATING FLUID IN A CONTAINER

(75) Inventors: Jacqueline van Driel, Drachten (NL); Klaas Kooijker, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 627 days.

(21) Appl. No.: 12/991,933

(22) PCT Filed: May 8, 2009

(86) PCT No.: PCT/IB2009/051901
§ 371 (c)(1),
(2), (4) Date: Nov. 10, 2010

(87) PCT Pub. No.: WO2009/138930
PCT Pub. Date: Nov. 19, 2009

(65) Prior Publication Data
US 2011/0062149 A1    Mar. 17, 2011

(30) Foreign Application Priority Data
May 14, 2008    (EP) .................................... 08156174

(51) Int. Cl.
*H05B 6/00* (2006.01)
*H05B 6/10* (2006.01)
*H05B 6/08* (2006.01)
*A47J 36/24* (2006.01)

(52) U.S. Cl.
CPC .................................. *A47J 36/2433* (2013.01)

(58) Field of Classification Search
CPC ... A47J 36/2416; A47J 36/2433; A47J 36/24; A47J 36/28; A47J 36/30; A47J 36/2411; A47J 36/36; A47J 36/2444; A47J 36/2461; F24J 1/00; H05B 6/02
USPC ......... 219/240, 386, 435, 436, 433, 437, 441, 219/523, 618, 438, 201, 387, 439, 446.1, 219/447.1, 448.11, 600, 626, 627, 628, 630, 219/635, 663, 665; 99/483; 62/371
See application file for complete search history.

(56) References Cited

U.S. PATENT DOCUMENTS

| | | | |
|---|---|---|---|
| 3,064,113 A | | 11/1962 | Pitrone |
| 5,118,927 A | * | 6/1992 | Eisenhauer .................... 219/437 |
| 5,208,896 A | | 5/1993 | Katayev |
| 6,032,481 A | | 3/2000 | Mosby |
| 6,307,182 B1 | * | 10/2001 | Lile ............................... 219/257 |

(Continued)

FOREIGN PATENT DOCUMENTS

| | | |
|---|---|---|
| DE | 20108363 U1 | 8/2001 |
| EP | 0722708 A1 | 7/1996 |

(Continued)

OTHER PUBLICATIONS

English Translation of Doumeng, EP 0895772, Feb. 10, 1999.*

(Continued)

*Primary Examiner* — Hung D Nguyen (57) ABSTRACT

A heating device for heating a fluid in a container, in particular milk in a baby bottle, the heating device including a heat transfer surface for transferring heat to the fluid, wherein the heating device is arranged to be brought into association with the container such that, in use, the heat transfer surface contacts the fluid to transfer heat to the fluid.

14 Claims, 5 Drawing Sheets

(56) References Cited

U.S. PATENT DOCUMENTS

| | | | |
|---|---|---|---|
| 6,427,863 B1 | 8/2002 | Nichols | |
| 6,454,127 B1 * | 9/2002 | Suomela et al. | 222/54 |
| 7,002,111 B2 * | 2/2006 | Bauer | 219/480 |
| 2006/0081599 A1 * | 4/2006 | Anderson | 219/438 |
| 2006/0254097 A1 * | 11/2006 | Alipour | 38/2 |

FOREIGN PATENT DOCUMENTS

| | | | |
|---|---|---|---|
| EP | 0895772 A1 * | 2/1999 | |
| FR | 2752377 A1 | 2/1998 | |
| FR | 2828082 A1 | 2/2003 | |
| GB | 2441825 A * | 3/2008 | |
| WO | 2004054414 A1 | 7/2004 | |
| WO | 2004091471 A2 | 10/2004 | |
| WO | 2006001745 A1 | 1/2006 | |
| WO | WO 2006109098 A1 * | 10/2006 | |

OTHER PUBLICATIONS

Abstract of Doumeng, EP 0895772, Feb. 10, 1999.*

* cited by examiner

DEVICE FOR HEATING FLUID IN A CONTAINER

The invention relates to a heating device for heating fluid in a container, particularly but not exclusively to a heating device for heating milk in a baby bottle.

Baby milk, which can, for instance, be either breast milk or pre-prepared formula milk, is generally stored in a refrigerator and heated from the relatively cool storage temperature of about 5° C. to body temperature, roughly 37° C., for feeding to a baby.

One method of heating baby milk is to use a microwave. However, this is generally not advisable since microwave heating can result in hot spots within the volume of milk causing the destruction of important nutrients in the milk. This is particularly the case with breast milk.

US patent document U.S. Pat. No. 6,427,863 describes a baby bottle warmer whereby the baby bottle is placed in hot water in an insulated cup to heat the milk through the bottle wall. This method of heating, although avoiding the use of a microwave, has further drawbacks relating to the effectiveness of the transfer of heat to the milk. The bottle wall is generally about 1 mm thick and made of polycarbonate, which does not conduct heat very well. Furthermore, when water is used as heat transfer medium, it also needs to be heated, which adds to the time and energy required to heat the milk. For instance, using a method of heating milk using a heated water bath, it can take about 4½ minutes to heat up a 9 oz/250 ml bottle from 5° C. to 37° C. in the home. In travel related scenarios, where the size of articles that can be transported and access to power is restricted, it can take much longer to heat a bottle of milk to the required temperature.

Hence, an improved device for heating fluid in a container would be advantageous, and in particular a more efficient baby bottle warmer for heating milk in a convenient and relatively quick manner.

According to the invention, there is provided a heating device for heating a fluid in a container, the heating device comprising a heat transfer surface for transferring heat to the fluid, wherein the heating device is arranged to be brought into association with the container such that, in use, the heat transfer surface contacts the fluid to transfer heat to the fluid. By making direct contact between a heat transfer surface and the fluid to be heated, the efficiency of heat transfer from the heating device to the fluid is improved.

The heat transfer surface, when brought into association with the container, can be arranged to extend substantially across an opening in the container. The heating device can also be further arranged to seal the opening in the container. By sealing the opening, spillage of the fluid during heating can be avoided. In addition, as a result of the seal, it is possible to arrange the container such that the opening is below the main volume of the container and such that the fluid is therefore located directly above the heating device. This improves convection within the fluid during the heating process and ensures that the fluid makes contact with the heating device even when the container is not full.

The container can comprise a baby bottle having a coupling arrangement for connecting a teat over the opening of the container, wherein the heating device is arranged to be coupled to the container using the coupling arrangement to bring the heat transfer surface into association with the container. Accordingly, a single coupling arrangement on the bottle is required for coupling both the teat and the heating device to the container.

The heating device can further comprise a coupling arrangement for coupling the heating device to the container to bring the heat transfer surface into association with the container.

The heat transfer surface can be formed by material selected from plastic, ceramic, glass and a substantially non-corroding metal.

The heating device can further comprise a heating element comprising a material having a positive temperature coefficient.

The heating device can be arranged to be heated by electromagnetic induction.

The heating device can further comprise a temperature sensor for detecting the temperature of the fluid.

The heating device may further comprise a controller for controlling the heat transferred to the fluid in accordance with an output from the temperature sensor. Accordingly, energy can be saved by reducing or switching off power to the heating device when the temperature reaches a predetermined level, for instance 37° C. Over-heating of the heating device and/or fluid can also be avoided.

The heating device can comprise a sensor for detecting the orientation of the heating device.

The heating device can further comprise a controller for controlling the heat transferred to the fluid in accordance with an output from the orientation sensor. The orientation sensor can, for instance, be used to determine when the container is oriented such that the fluid will be in contact with the heat transfer surface and to reduce or switch off power to the heating device when the orientation of the container is such that fluid will not be in contact with the heat transfer surface.

According to the invention, there is further provided a container for heating a fluid, the container comprising a cavity for holding the fluid and a heating device according to the invention.

The container can comprise a baby bottle, the container further comprising a teat for feeding a baby arranged to be coupled to the container. The teat can, for instance, be coupled to the container in place of the heating device once the fluid has been heated. Such an arrangement prevents the heating device from being brought into proximity with a baby when the baby is fed from the teat.

According to the invention, there is also provided a heating system for heating a fluid in a container, the system comprising a heating device according to the invention and a base unit for providing power to the heating device.

The base unit can be further arranged to support the heating device (1, 40, 60) such that, in use, the heating device (1, 40, 60) is arranged to heat the fluid (30) in the container (2) from below.

The base unit can be arranged to produce a magnetic field to provide power to the heating device.

The base unit can be arranged to provide power to the heating device from at least one source selected from a battery, a rechargeable battery pack, a mains power supply and a car battery.

The heating system can comprise a timer.

The base unit can be further arranged to control the power to the heating device in accordance with the output from the temperature sensor of the heating device.

The base unit can be further arranged to control the power to the heating device in accordance with the output from the orientation sensor of the heating device.

Embodiments of the invention will now be described, by way of example, with reference to the accompanying drawings, in which.

Figure 1:
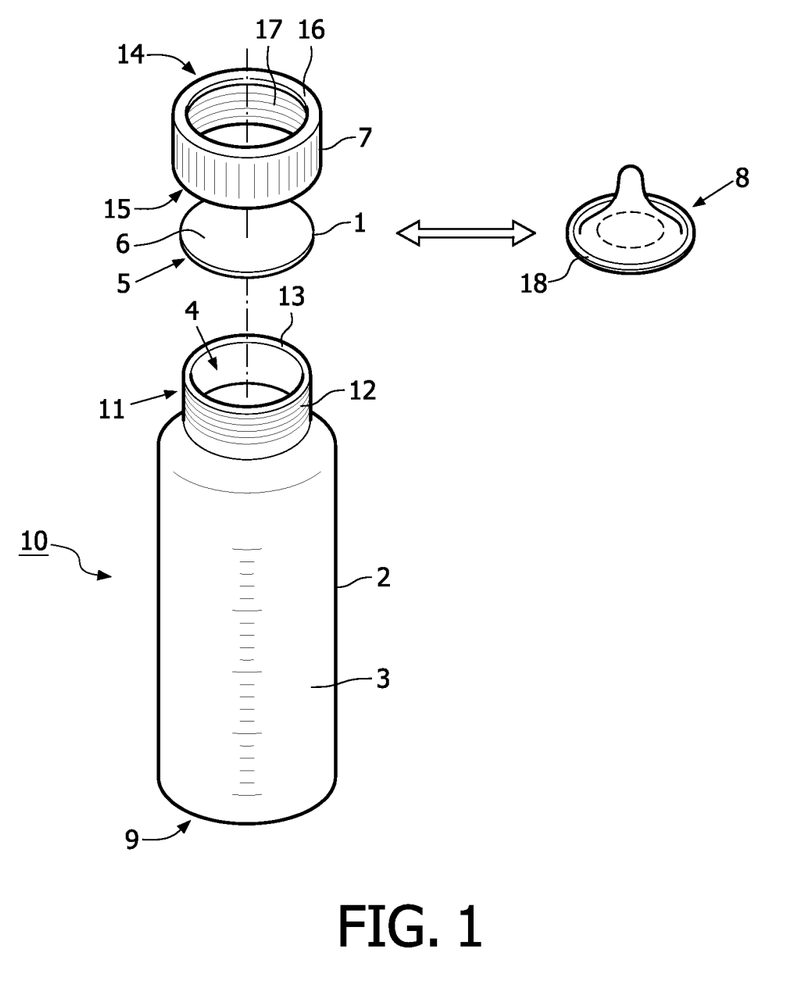
FIG. 1 illustrates a heating device, container and coupling device according to an embodiment of the invention.

FIG. 1 illustrates a heating device 1 according to an embodiment of the invention, arranged for use with a container 2 suitable for holding fluids. In the present example, the container 2 is a baby bottle for holding milk to be warmed and subsequently fed to a baby. However, the container 2 may alternatively be arranged for other purposes and/or to hold other fluids. The container 2 has a cavity 3 and an opening 4. The heating device 1 is generally disc-shaped and formed of moulded plastic. The heating device has first and second surfaces 5, 6 and an internal heating element (see FIG. 2). Also illustrated in FIG. 1 are a coupling device 7 and a teat 8.

The first surface 5 of the heating device 1 is arranged, during use, to contact fluid within the cavity 3 of the container 2 so as to transfer heat directly to the fluid. The coupling device 7 is arranged to provide a force to bias the heating device 1 towards the opening 4 in the container 2, such that the first surface 5 of the heating device 1 extends across and substantially seals the opening 4.

The container 2 is generally formed as an elongated polycarbonate tube that is closed at a first end 9 and has the opening 4, also referred to as a mouth, at a second end 10, also referred to as the mouth end. The opening 4 is defined by a neck portion 11 of the container 2 formed as a hollow cylinder having an external thread 12, the neck portion 11 having a smaller diameter than the container 2 and extending co-axially from the container 2 and terminating in a circular neck rim 13.

The coupling device 7, in the present example, is formed of plastic and generally has a hollow cylindrical shape with first and second openings 14, 15 at respective ends and a lip 16 extending inwardly from the circumferential edge of the first opening 14. An internal thread 17 is provided within the coupling device 7.

The coupling device 7 is arranged to couple each of the heating device 1 and the teat 8 individually to the container 2, the heating device 1 and the teat 8 being interchangeable depending on whether fluid in the container 2 is to be heated using the heating device 1 or fed via the teat 8 to a baby. When the coupling device 7 is used to connect the heating device 1 to the container 2, the internal thread 17 of the coupling device 7 is screwed onto and engages with the external thread 12 of the container neck portion 11, the lip 16 providing a biasing force against the second surface 6 of the heating device 1 to bring the first surface 5 towards the opening 4 so as to extend across the opening 4. The first surface 5, in particular, is brought into contact with the rim 13 of the neck portion 11 and, in this manner, seals the opening 4.

The teat 8 is made of silicone rubber and contains a hole or a plurality of holes that allow fluid contained in the cavity 3 of the container 2 to pass through the teat 8 and into a baby's mouth. Fluids contained in the cavity 3 flow through the teat 8 in a restricted manner, rather than flowing freely through the neck portion 11 of the container 2. The teat 8 has an outwardly extending circumferential lip 18. When the coupling device 7 is used to connect the teat 8 to the container 2, the internal thread 17 of the coupling device 7 is screwed onto and engages with the external thread 12 of the container neck portion 11, providing a biasing force against the circumferential lip 18 of the teat 8 to bring the teat 8 towards the opening 4 such that the circumferential lip 18 of the teat 8 is brought into contact with the rim 13 of the neck portion 11 and the teat 8 extends across the opening 4.

The external thread 12 of the neck portion 11 and the internal thread of the coupling device 7, also referred to as a teat ring, are described here for illustrative purposes. Alternative arrangements can be used to couple the heating device 1 and/or teat 8 to the container 2, for instance an elasticated, snap fit or click-on connection or other suitable mechanism for releasably connecting the container 2 with the heating device 1 and/or teat 8.

Figure 2:
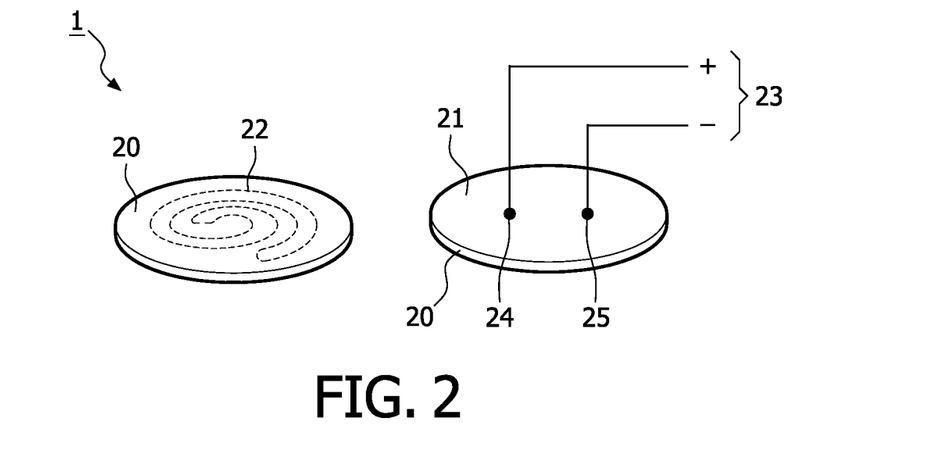
FIG. 2 illustrates the heating device of FIG. 1.

Referring to FIG. 2, the heating device 1 according to an embodiment of the invention is formed as a flat round plate whereby the first and second surfaces 5, 6 are formed by respective first and second sidewalls 20, 21. The first sidewall 20 has at least one heating element 22 embedded within the wall 20. In the illustration, one heating element 22 is shown. The heating element 22 is moulded within the sidewall 20 of the heating device 1.

The heating element 22 is made of electrically resistive material and is arranged, in use, to receive electricity from a power supply source 23. The heating element 22 may be disposed in a spiral formation and, in the present example, has sufficient diameter to provide heat over a substantial portion of the cross section of the opening 4 of the container 2 when fitted to the container 2. In the present example, the heating element 22 is made of a material having a positive temperature coefficient. This type of heating material prevents the temperature of the heating device 1 increasing above a predetermined temperature, for instance a temperature in the range 50° C. to 70° C., making the heating device 1 intrinsically safe, as well as preventing any destruction of nutrients in the fluid 30, such as breast milk, to be heated.

The heating device 1 is generally formed from plastic, with a thin layer of plastic over the heating element 22 preventing contamination of the milk with metallic particles from the heating element 22. Having a thin layer of plastic, for instance approximately 0.5 mm in thickness, minimises any reduction in heat transfer from the heating element 22 to the fluid and also provides an easy-clean surface.

In alternative embodiments, the heating device 1 can be formed in other ways. For instance, the heating device can be formed of stainless steel or another metal, which can be covered with a non-conducting layer such as lacquer or enamel, on top of which the heating element is pressed, printed or sprayed. A polymer-based, ceramic or other coating can also be applied on top of the heating element.

As shown in FIG. 2, the second sidewall 21 of the heating device 1 includes first and second connectors 24, 25 to connect the heating element 22 to the power supply source 23 to heat the at least one heating element 22.

Figure 3:
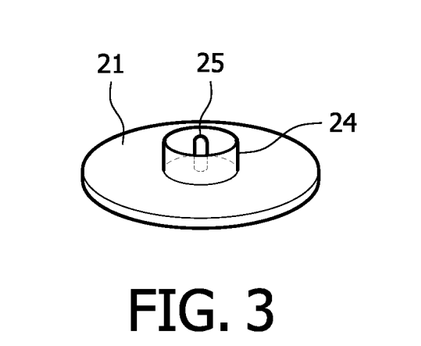
FIG. 3 illustrates a heating device according to a further embodiment of the invention.

FIG. 3 illustrates an example of the heating device 1 in which the connectors 24, 25 are arranged in the form of a first metal connector 24 having a hollow cylindrical shape mounted on and extending axially away from the second sidewall 21 of the heating device 1 and a second connector 25 formed as a metal pin extending away from the second sidewall 21 along the axis of the cylinder of the first metal connector 24.

Figure 4:
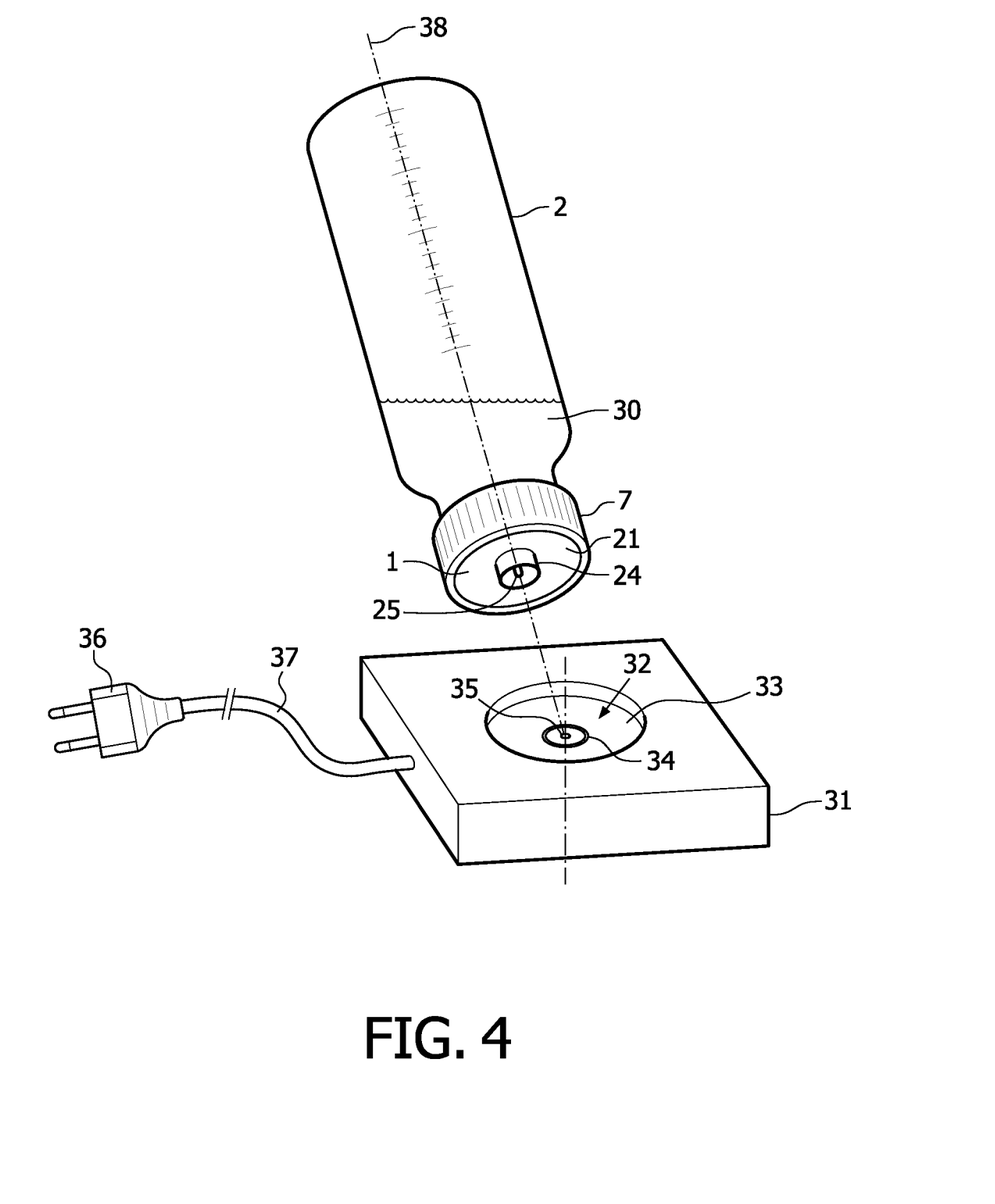
FIG. 4 illustrates a system for heating a fluid according to an embodiment of the invention, using the heating device of FIG. 3.

FIG. 4 illustrates the heating device 1 of FIG. 3 in use coupled to a container 2 by the coupling device 7, the container 2 holding fluid 30, in the present example formula milk to be heated. Also illustrated is a base unit 31 having a recess 32 into which the heating device 1 and coupling device 7 can be received such that the heating device 1, coupling device 7 and container 2 are supported by the base unit 31. In particular, the recess 32 is circular in cross-section and has a size and depth such that the coupling device 7 holding the heating device 1 can be received in the recess 32. In the floor 33 of the recess 32 a circular channel 34 and a hole 35 are concentrically formed.

In use, milk 30 is inserted into the baby bottle 2 and the heating device 1 is placed inside coupling device 7 and fastened to the neck portion 11 of the bottle 2. The baby bottle 2 is turned such that the mouth end 10 is facing downwards, so that the sidewall 20 of the heating device 1 having the heating element 22 comes into direct contact with the milk 30, irrespective of how much milk 30 is in the container 2. The container 2 is then mounted in the base unit 31 such that the coupling device 7 is received in the recess 32, the first connector 24 of the heating device 1 is received in the circular channel 34 and the second connector 25 of the heating device 1 is received in the hole 35. Respective electrical contacts (not shown) are located within the circular channel 34 and hole 35 of the base unit 31 and are used to provide power to the heating device 1 by electrically contacting the first and second connectors 24, 25 of the heating device 1. The base unit 31 is connected to a power source 36, such as the mains electricity supply via a power cable 37 and plug.

Accordingly, in use, the milk 30 comes into direct contact with the first surface 5 of the heating device 1 having the heating element 22, which is supplied with power via the base unit 31 and heats up the milk 30. This results in direct heat transfer from the heating element 22 to the milk 30. Also, due to the rotational symmetry of the coupling device 7 and electrical contacts 24, 25 of the heating device 1, the container 2 can be received in the recess 32 of the base unit 31 in any rotational configuration about the axis 38 of the container 2 and, once located in the recess 32, can turn through 360 degrees without losing electrical contact with the base unit 31.

The power supply source 36, although illustrated as a mains plug, can alternatively be a battery pack, for instance a rechargeable battery pack, car battery or other suitable power source. Experimentation has shown that 4 AA sized, 1.5V batteries, can provide sufficient power to heat a 9 oz (250 ml) bottle of milk from 5° C. to 37° C. In alternative embodiments it is possible to provide the base unit 31 with a plurality of adaptors/power sources to receive various power supplies according to the circumstances of the user. It is also possible to recharge the battery pack with a power source such as the car battery or the mains.

After heating the milk 30, the coupling device 7 is disengaged from the container 2 and the heating device 1 is removed. The teat 8 can then be placed inside the coupling device 7 and fastened to the container 2 in order to feed a baby with the warmed milk. Removal of the heating device 1 prior to use of the container 2 as a drinking vessel avoids any risk of burns caused by the heating device 1 while a baby is fed from the bottle 2. Although a base unit 31 has been described which provides power to the heating device 1 via electrical contact, other arrangements are possible. For instance, the heating element 22 of the heating device 1 can be manufactured using a ferrous material suitable for induction heating, such as iron or mild steel. The base unit 31 can, in this case, be arranged to provide a changing magnetic field to the heating device 1 to cause electromagnetic induction within the inductive heating element 22 to heat the fluid 30 in the container 2. Induction heating can result in a substantially even distribution of heat across the heat transfer surface of the heating device, avoiding any local hot spots which may occur when a heating element 22 is used in conjunction with a heating device formed of plastic. Induction heating also improves the ease with which the heating device and base station 31 are coupled together, as well as facilitating cleaning of both parts, since electrical contacts are not required, enabling a simpler connecting arrangement and easy-clean surfaces to be provided.

In other embodiments of the invention, heat can be generated in the base unit 31 rather than in the heating device 1 itself. For instance, a heating element (not shown) can be located in the floor 33 of the recess 32 of the base unit 31 and used to transfer heat to the fluid 30 via a heating device, which can be manufactured using a material having high thermal conductivity, such as stainless steel, aluminium or copper.

In further embodiments, the heating device 1 can be arranged to generate heat using a phase change material (PCM). This type of heating device 1 does not need a separate power supply. However, a significant amount of phase change material is generally required to heat fluids such as milk, for instance to the order of 75 g of PCM for 100 g of milk, which would increase the size of the heating device.

Figure 5:
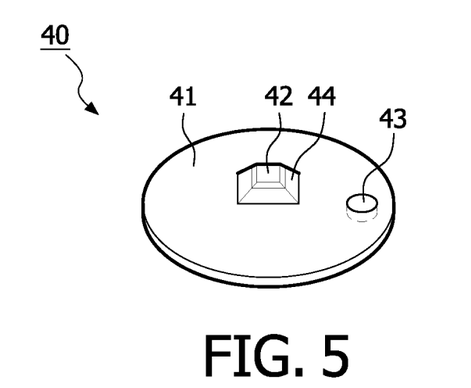
FIG. 5 illustrates a heating device according to another embodiment of the invention.

FIG. 5 illustrates a heating device 40 according to a further embodiment of the invention. The heating device 40 has a heat transfer surface 41 on which a temperature sensor 42 and an orientation sensor 43 are mounted. The temperature sensor 42 is, in particular, mounted on a raised portion 44 separated from the heat transfer surface 41 by several millimeters. This separates the temperature sensor 42 from the heat transfer surface 41 and, in use, places the temperature sensor 42 within the volume of fluid to be heated. The orientation sensor 43 can be a simple tilt, inclination or other type of orientation sensor which can determine whether the heat transfer surface 41 is facing substantially upwards, or facing substantially downwards. A photo-interrupting arrangement having an internally located movable ball, the position of which is detected by one or more photodetectors, can be used. Alternatively, a sensor such as a magnetic sensor or other form of gravitational mechanical sensor can be used. A controller is also provided, in the present example as a microchip located within the raised portion 44 of the heating device 40.

Figure 6:
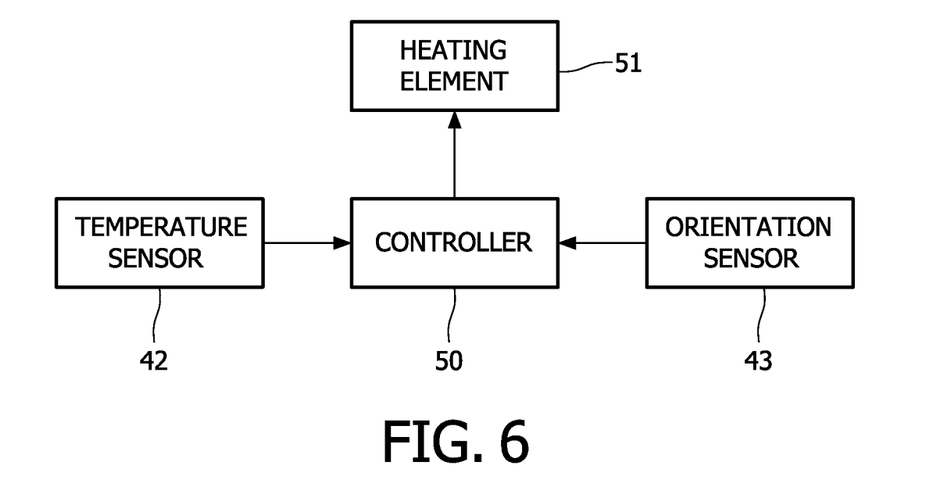
FIG. 6 schematically illustrates the electrical components of the heating device of FIG. 5.

FIG. 6 schematically illustrates the electrical components of the heating device 40 of FIG. 5. The temperature sensor 42 and orientation sensor 43 are each connected to the controller 50, which is in turn connected to a heating element 51 of the heating device 40.

In use, the controller 50 is arranged to control the power provided to the heating element 51 based on the outputs from the temperature sensor 42 and orientation sensor 43. In particular, the output from the temperature sensor can be monitored to determine when a fluid heated by the heating device 40 reaches a predetermined temperature, for instance 37° C. for baby milk. The power to the heating device 1 is switched off by the controller 50 when this temperature is reached. In alternative examples of the invention, the power is reduced or slowly decreased when the fluid is detected to have reached a desired temperature. Automatically switching off or reducing the power to the heating element 51 can save battery power and provide extra protection against overheating.

In addition, the output from the orientation sensor 43 can be monitored by the controller 50 to ensure that the heat transfer surface 41 is facing upwards during heating, and to switch off the power to the heating element 51 when it is determined that the heat transfer surface 41 is facing downwards, and will not therefore be in contact with the fluid.

In further embodiments, the temperature sensor 42 can be used to determine the temperature of the heat transfer surface 41 and monitored to keep the temperature substantially constant. The temperature sensor 42 can be mounted directly on the heat transfer surface 41 and the controller 50 located elsewhere within the heating device 40 or in the base station 31. In this case, the power needed to maintain a particular temperature of the heat transfer surface 41 can be monitored to determine the milk temperature indirectly, since the power will reduce as the temperature of the milk or other fluid increases.

While a heating device 40 having both a temperature sensor 42 and orientation sensor 43 has been described, further embodiments can include only one of these sensors, with appropriate adaptation of functioning of the controller 50. Also, the controller 50 need not be located in the heating device 40, but could alternatively by located in the base unit 31 and used to control power to the heating device 40 based on signals received from the temperature and orientation sensors 42, 43 located in the heating device 40.

In other embodiments, a timer can be provided that can be set by the user to a desired heating time and a controller used to switch off the heating device when the time is reached.

A magnetic stirring device can also be added to the fluid in the container. A magnet can be placed in the fluid and the base unit 31 can be provided with a magnetic coil that is arranged to produce an alternating magnetic field, which makes the magnet turn. In this way, milk and other fluids can be stirred thoroughly. The magnet can be either a loose component or it can be attached to the heating device.

The container 2 can also be covered by a thermally insulating material. Thermal insulation reduces the heat radiated from the fluid in the container, thus improving efficiency.

Figure 7:
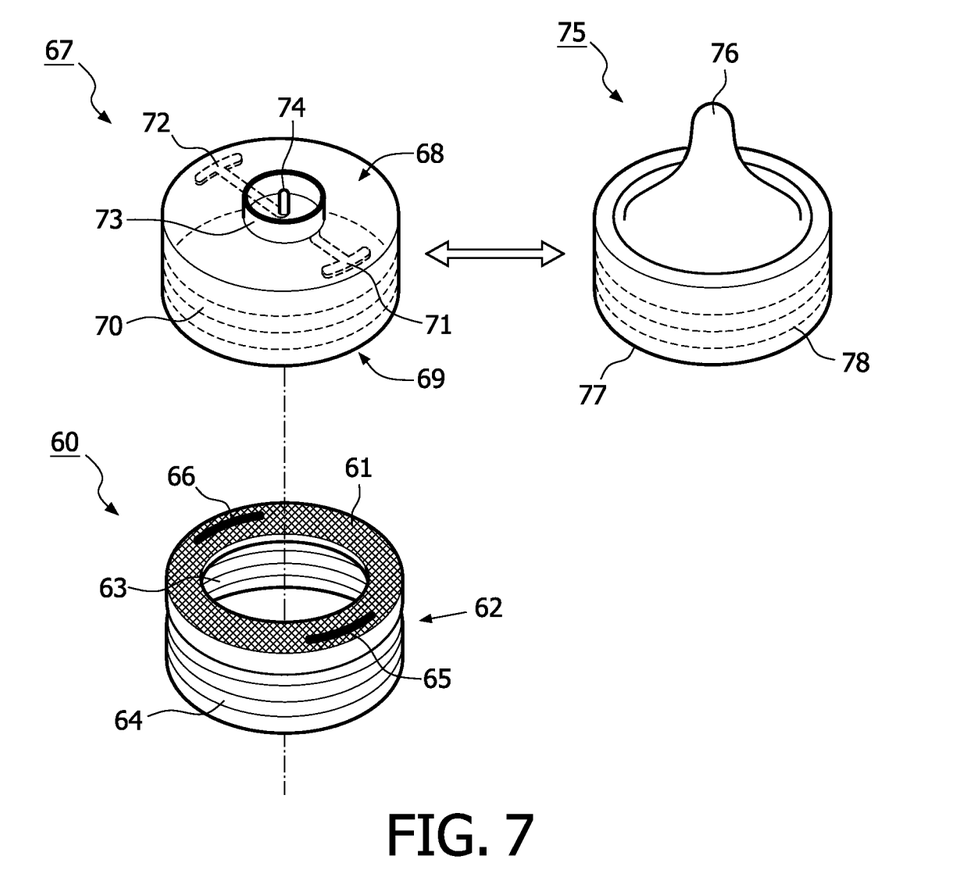
FIG. 7 illustrates a heating device according to another embodiment of the invention.

Referring to FIG. 7, a heating device 60 according to a further embodiment of the invention is described, which is suitable for use with the container 2 and base unit 31 described with reference to FIG. 4. The heating device 60 has a heat transfer portion 61 is disposed within a coupling device 62. The coupling device 62 is formed of plastic and generally has a hollow cylindrical shape substantially as that described with reference to FIG. 1. An internal thread 63 is provided on an internal surface of the coupling device 62 and an external thread 64 is provided on an outside surface of the coupling device 62. The heat transfer portion 61 is substantially ring-shaped, is connected to one end of the coupling device 62 and has a heating element (not shown) embedded within it. First and second electrical connectors 65, 66 are provided on the surface of the heat transfer portion 61 for connecting the heating element to an electrical power supply.

A container cap 67 is also illustrated in FIG. 7, substantially formed as a hollow cylinder which is closed at a first end 68, open at a second end 69 and has a thread 70 on an inside surface. First and second internal cap electrical connectors 71, 72 are provided on the inside surface of the closed end 68 of the container cap 67 for connecting to the first and second electrical connectors 65, 66 of the heating device 60. The first internal cap electrical connector 71 extends towards and connects with a first external cap electrical connector 73 formed having a hollow cylindrical shape mounted on and extending axially away from the closed end 68 of the container cap 67. The second internal cap electrical connector 72 extends towards and connects with a second external cap electrical connector 74 formed as a metal pin extending away from the closed end 68 of the container cap 67 along the axis of the cylinder of the first external cap electrical connector 73.

A teat device 75 is also illustrated in FIG. 7, having a teat 76 and a teat connecting portion 77, the teat 76 being made of silicone rubber and having a hole or a plurality of holes that allow fluid to pass through the teat 76 and into a baby's mouth. The teat connecting portion 77 is formed of plastic as a hollow cylinder which is open at both ends, the teat 76 being disposed in a first end. A thread 78 is provided on an inside surface of the teat connecting portion 77.

In use, to heat fluid in a container 2 such as the baby bottle illustrated in FIG. 4, the heating device 60 is screwed onto the neck portion 11 of the container 2, the internal thread 63 of the coupling device 62 engaging with the thread 12 provided on the neck portion 11. The container cap 67 is then screwed onto the heating device 60, such that the internal thread 70 of the cap 67 engages with the external thread 64 of the coupling device 62, and such that an electrical connection is formed between the respective first and second electrical connectors 65, 66 of the heating device 60 and the first and second internal cap electrical connectors 71, 72 of the container cap 67. The container cap 67 also seals the open mouth of the container 2 such that the fluid cannot escape. The container 2, heating device 60 and cap 67 are then turned such that the closed end 68 of the cap 67 is facing downwards and the cap 67 is inserted into a base unit, such as the base unit 31 illustrated in FIG. 4. In this way, the first external cap electrical connector 73 of the container cap 67 is received in the circular channel 34 of the base unit 31 and the second external cap electrical connector 74 of the container cap 67 is received in the hole 35 of the base unit 31, allowing electrical power to be provided to the heating element of the heating device 60.

Once the fluid in the container has been heated by the heating device 60, the container cap 2 can be unscrewed from the heating device 60 and the heating device 60 unscrewed from the container 2. The teat device 75 can then be screwed onto the container 2 such that the internal thread 78 of the teat connecting portion 77 engages with the thread 12 provided on the neck portion 11 of the container 2.

In alternative embodiments, the teat device 75 can be arranged to screw onto the heating device 60 rather than or in addition to being screwed onto the container 2, such that once the fluid in the container 2 has been heated, it can be fed to a baby via the teat 76 without removing the heating device 60 from the container 2. It is also possible, using such an arrangement, to heat milk or other fluids in the container 2 during feeding, as milk flows through the heating element. However, arrangements in which heating devices are removed from baby bottles before the baby is fed are safer in terms of minimising the risk of burns.

An adapted container, for instance an adapted baby bottle, can be provided having an in-built heating device, for instance one or more heating elements in the bottom of the baby bottle.

Although substantially flat, round, heating devices 1, 40, 60, have been described, other arrangements are possible. For instance, ridges can be provided on the heat transfer surfaces of the above-described heating devices 1, 40, 60 to improve the placement of the heating device 1, 40, 60 on the container 2, to improve the sealing of the opening 4 in the container 2, or to improve heat transfer from the heating device 1, 40, 60 into the fluid 30 by increasing the area of the heat transfer surfaces. The heating devices 1, 40, 60 can be manually cleaned or cleaned using a dishwasher, and can also be placed in a sterilizer.

Although claims have been formulated in this application to particular combinations of features, it should be understood that the scope of the disclosure of the present subject matter also includes any novel features or any novel combination of features disclosed herein either explicitly or implicitly or any generalization thereof, whether or not it relates to the same invention as presently claimed in any claim and whether or not it mitigates any or all of the same technical problems as does the present invention.

Further, while the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. The Figures and description are to be regarded as illustrative only and do not limit the subject matter. Any reference signs in the claims should not be construed as limiting the scope.

The invention claimed is:

1. A heating device for heating a fluid in a container having a cavity, the heating device comprising:
    a substantially flat and disc shaped member having a heating element embedded therein and comprising a substantially flat and disc shaped heat transfer surface for transferring heat to the fluid, wherein the heating device is arranged to be brought into association with the container such that, in use when the container is positioned facing downwards, the heat transfer surface extends across an opening of the container opposite a floor of the cavity, sealing the opening, and contacting the fluid at the opening to transfer heat to the fluid, and wherein the heating device is arranged to be heated by electromagnetic induction;
    a sensor for detecting orientation of the heating device;
    and a controller, coupled to the sensor, to control power being delivered to the heating device in accordance with the detected orientation output from the sensor, wherein the controller interrupts power delivery when the orientation indicates that the fluid is not in contact with the heat transfer surface.

2. The heating device according to claim 1, wherein the container comprises a baby bottle having a coupling arrangement for connecting a teat over the opening of the container, and wherein the heating device is arranged to be coupled to the container using the coupling arrangement to bring the heat transfer surface into association with the container.

3. The heating device according to claim 1 further comprising a coupling arrangement for coupling the heating device to the container to bring the heat transfer surface into association with the container.

4. The heating device according to claim 1, wherein the heat transfer surface is formed by material selected from plastic, ceramic, glass and a substantially non-corroding metal.

5. The heating device according to claim 1, further comprising a heating element comprising a material having a positive temperature coefficient.

6. The heating device according to claim 1, further comprising a temperature sensor for detecting the temperature of the fluid.

7. A container for heating a fluid, the container comprising a cavity for holding the fluid and a heating device, wherein the heating device comprises:
    a substantially flat and disc shaped member having a heating element embedded therein and comprising a substantially flat and disc shaped heat transfer surface for transferring heat to the fluid, wherein the heating device is arranged to be brought into association with the container such that, in use when the container is positioned facing downwards, the heat transfer surface extends substantially across an opening of the container opposite a floor of the cavity, sealing the opening, and contacting the fluid at the opening to transfer heat to the fluid, and wherein the heating device is arranged to be heated by electromagnetic induction;
    a sensor for detecting orientation of the heating device; and
    a controller, couple to the sensor, to control power being delivered to the heating device in accordance with the detected orientation output from the sensor, wherein the controller interrupts power delivery, when the orientation indicates that the fluid is not in contact with the heat transfer surface.

8. The container according to claim 7, wherein the container comprises a baby bottle, the container further comprising:
    a teat for feeding a baby arranged to be coupled to the container.

9. A heating system for heating a fluid in a container having a cavity, the system comprising:
    a heating device; and
    a base unit for providing power to the heating device,
    wherein the heating device comprises:
    a substantially flat and disc shaped member having a heating element embedded therein and comprising a substantially flat and disc shaped heat transfer surface for transferring heat to the fluid, wherein the heating device is arranged to be brought into association with the container such that, in use when the container is positioned facing downwards, the heat transfer surface extends substantially across an opening of the container opposite a floor of the cavity and contacts the fluid at the opening to transfer heat to the fluid, and wherein the heating device is arranged to be heated by electromagnetic induction;
    and a sensor for detecting orientation of the heating device; and
    a controller, coupled to the sensor, to control power being delivered to the heating device in accordance with the detected orientation output from the sensor, wherein the controller interrupts power delivery when the orientation indicates that the fluid is not in contact with the heat transfer surface, said controller being included in one of the base unit or heating device.

10. The heating system according to claim 9, wherein the base unit is further arranged to support the heating device such that, in use, the heating device is arranged to heat the fluid in the container from below.

11. The heating system according to claim 9, further comprising the container comprising a cavity for holding the fluid.

12. The heating system according to claim 9, wherein the base unit is arranged to produce a magnetic field to provide power to the heating device.

13. The heating system according to claim 9, wherein the base unit is arranged to provide power to the heating device from at least one source selected from a battery, a rechargeable battery pack, a mains power supply and a car battery.

14. The heating system according to claim 9, wherein the heating device comprises a temperature sensor for detecting the temperature of the fluid, and wherein the controller is further arranged to control the power to the heating device in accordance with the detected temperature output from the temperature sensor.

* * * * *